US009277465B1

(12) United States Patent
Oroskar et al.

(10) Patent No.: US 9,277,465 B1
(45) Date of Patent: Mar. 1, 2016

(54) CONTENTION-FREE HANDOFF RETURN IN A WIRELESS NETWORK

(71) Applicant: Sprint Communications Company L.P., Overland Park, KS (US)

(72) Inventors: Siddharth Oroskar, Overland Park, KS (US); Xianghong Zeng, Overland Park, KS (US); Maulik K. Shah, Overland Park, KS (US); John W. Prock, Peculiar, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 200 days.

(21) Appl. No.: 13/974,349

(22) Filed: Aug. 23, 2013

(51) Int. Cl.
*H04W 36/00* (2009.01)

(52) U.S. Cl.
CPC ................................ *H04W 36/0072* (2013.01)

(58) Field of Classification Search
CPC ................................................. H04W 36/0072
USPC .................................. 370/331, 350; 455/438
See application file for complete search history.

(56) References Cited

U.S. PATENT DOCUMENTS

| 8,223,791 | B2 | 7/2012 | Meyer et al. | |
| 8,305,964 | B2 | 11/2012 | Fischer et al. | |
| 2008/0267131 | A1* | 10/2008 | Kangude et al. | 370/331 |
| 2009/0286541 | A1 | 11/2009 | Maheshwari et al. | |
| 2010/0027507 | A1* | 2/2010 | Li et al. | 370/331 |
| 2010/0202402 | A1 | 8/2010 | Dalsgaard et al. | |
| 2010/0279695 | A1* | 11/2010 | Amirijoo et al. | 455/438 |
| 2012/0208539 | A1* | 8/2012 | Alonso-Rubio et al. | 455/436 |

* cited by examiner

*Primary Examiner* — Parth Patel

(57) ABSTRACT

A first enhanced Node B (eNB) and method for contention-free handoff return in a wireless network are provided. The first eNB in one example embodiment includes a transceiver system configured to communicate with a User Equipment (UE) and a processing system coupled to the transceiver system and configured to receive signal strength information from the UE, with the processing system being further configured to obtain a pre-handoff CF preamble for handoff of the UE from the first eNB to the second eNB, provide the pre-handoff CF preamble to the UE, generate a post-handoff CF preamble for the UE where the UE can use the post-handoff CF preamble to return from the second eNB to the first eNB, and provide the post-handoff CF preamble to the UE.

17 Claims, 6 Drawing Sheets

CONTENTION-FREE HANDOFF RETURN IN A WIRELESS NETWORK

TECHNICAL FIELD

Aspects of the disclosure are related to the field of wireless communications, and in particular, to contention-free handoff return in a wireless network.

TECHNICAL BACKGROUND

Wireless communication systems, such as cellular voice and data networks, typically include multiple wireless access nodes spread over a geographic area. As a result, wireless communication devices can register at various wireless access nodes and access communication services. In many examples, the wireless communication devices are mobile, and can move between wireless coverage areas of the wireless access nodes. As a result, people can use cellular telephones in a wide variety of locations and can make calls while moving or traveling.

Continuous cellular telephone service is available through handoffs, wherein an active cellular telephone can move from cell to cell in a cellular network. The cellular network hands off the cellular telephone from one base station to the next. As a result, a user receives continuous and uninterrupted service.

A handoff may occur where the cellular telephone is moving from one cell to the next and a handoff must be performed for the cellular telephone to maintain communications. Alternately, a handoff may occur where a cellular telephone is in a region overlapped by another cell and the cellular telephone is handed off to provide more capacity in the cell. In another alternative, a handoff may occur where a cellular telephone is experiencing interference in a current cell and is handed off to a neighboring cell to reduce interference.

In a handoff, an adjacent cell will be using a different set of frequencies in order to avoid interference. Consequently, during a handoff process, the cellular telephone must negotiate with both a current cell and a next cell over the transfer of service. Issues that must be addressed are the identity of the cellular telephone and the traffic load/capacity of the next cell, for example.

Overview

Systems and methods for contention-free handoff return in a wireless network are provided herein. In one example, a first enhanced Node B (eNB) for contention-free handoff return in a wireless network includes a transceiver system configured to communicate with a User Equipment (UE) and a processing system coupled to the transceiver system and configured to receive a signal strength and an interference information from the UE via the transceiver system, with the processing system being configured to obtain a pre-handoff CF preamble for handoff of the UE from the first eNB to a second eNB, provide the pre-handoff CF preamble to the UE, generate a post-handoff CF preamble for the UE, and provide the post-handoff CF preamble to the UE.

In an example of a contention-free handoff return method for a wireless network having a first enhanced Node B (eNB), the method includes in the first eNB, obtaining a pre-handoff contention-free (CF) preamble for handoff of the UE from the first eNB to a second eNB, in the first eNB, providing the pre-handoff CF preamble to the UE, in the first eNB, generating a post-handoff CF preamble for the UE, and in the first eNB, providing the post-handoff CF preamble to the UE.

In another example of a contention-free handoff return method for a wireless network having a first enhanced Node B (eNB), the method includes in the first eNB, obtaining a pre-handoff contention-free (CF) preamble for handoff of the UE from the first eNB to a second eNB, in the first eNB, providing the pre-handoff CF preamble to the UE, in the first eNB, comparing a first eNB signal strength of a signal received in the UE from the first eNB to a second eNB signal strength of a signal received in the UE from the second eNB, in the first eNB, generating a post-handoff CF preamble if a signal strength difference between the first eNB signal strength and the second eNB signal strength does not exceed a predetermined strength similarity range, and in the first eNB, providing the post-handoff CF preamble to the UE.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
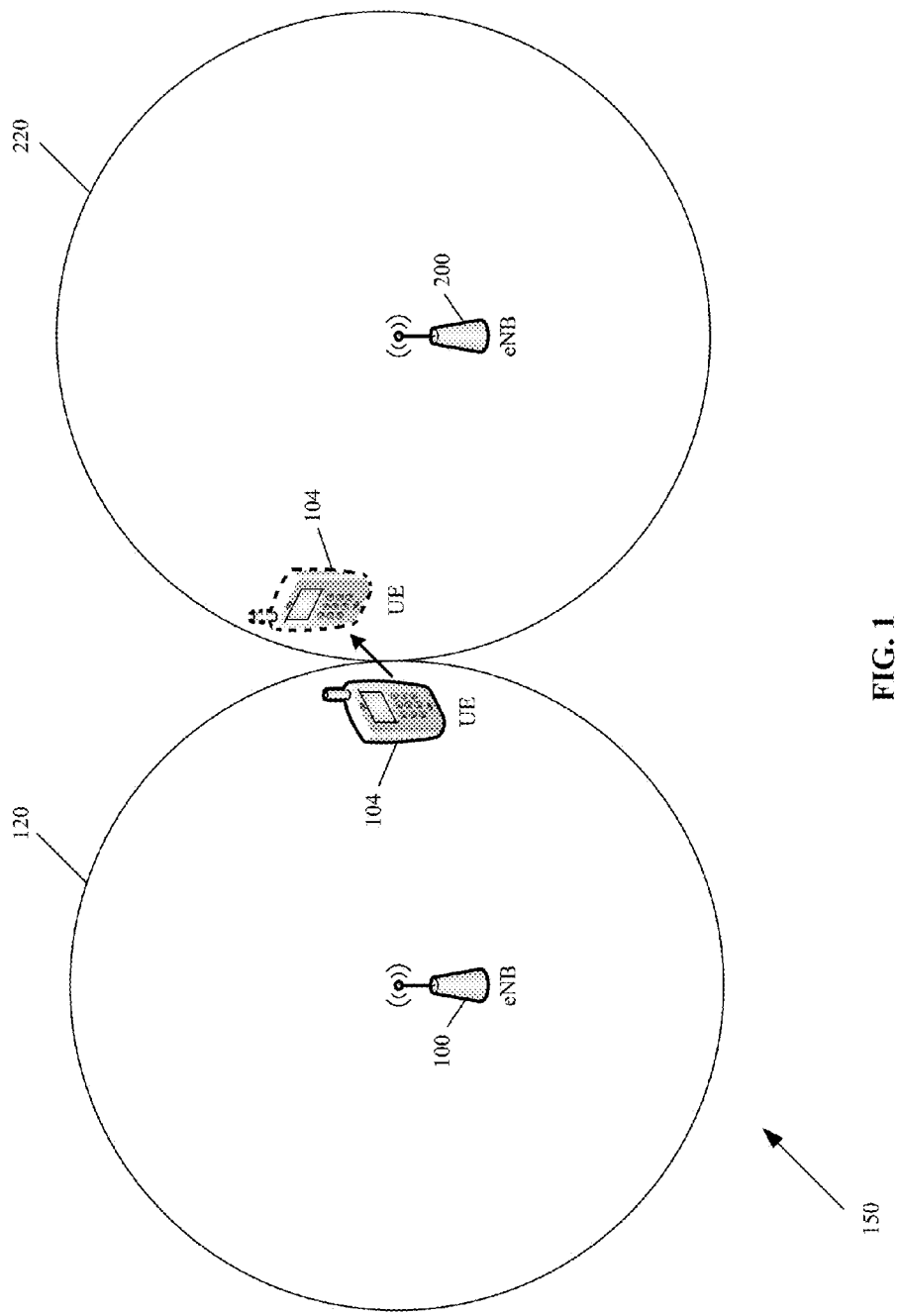
FIG. 1 shows an exemplary wireless network.

FIG. 1 shows an exemplary wireless network 150. The wireless network 150 in some examples comprises a Long-Term Evolution (LTE) wireless network 150. The wireless network 150 includes at least a first enhanced/evolved Node B (eNB) 100 and a second eNB 200. It should be understood that the wireless network 150 can include other components that are omitted for clarity. The eNBs 100 and 200 comprise evolved base stations that control and wirelessly communicate with mobile devices. The eNBs 100 and 200, and other devices of the wireless network 150, exchange communications using a LTE wireless communication protocol or a Voice Over LTE (VoLTE) wireless communication protocol, for example.

The first eNB 100 includes a cell coverage area 120 and the second eNB 200 includes a cell coverage area 220. In the figure, the second eNB 200 is located substantially adjacent to the cell coverage area 120 of the first eNB 100. The cell coverage area 220 of the second eNB 200 may approach or even overlap the cell coverage area 120 of the first eNB 100.

A User Equipment (UE) 104 is shown within the cell coverage area 120 and is registered with the first eNB 100. The UE 104 comprises a wireless communication device that moves within the eNB cell coverage areas. Further, the UE 104 can move between eNB cell coverage areas.

The UE 104 can monitor wireless conditions in relation to the eNB 100, including a received signal strength and a Channel Quality Indicator (CQI), for example. The UE 104 can transmit such values to the eNB 100. When operating within the cell edge region, the UE 104 will likely experience low signal strengths. The UE 104 will likely experience low signals strengths in both the forward link from the eNB 100 to the UE 104 and in the reverse link from the UE 104 to the eNB 100. In addition, the UE 104 can monitor the signals received from other devices, including from the second eNB 200 (and other adjacent eNBs).

In the figure, the UE 1054 is operating at a cell edge region of the cell coverage area 120. When the UE 104 is moving out of the cell coverage area 120, as indicated by the arrow in the figure, it may become necessary for the UE 104 to be handed off from the first (or source) eNB 100 to the second (or target) eNB 200.

Generally, a UEs first access to the system is performed by means of a random access (RA) procedure. The objectives of the RA procedure may include achieving initial access to a cell, handover between cells, scheduling request (request for radio resources), timing synchronization, and the like.

During the handoff process, the UE 104 obtains a preamble that is used to initiate communications with the target eNB 200 from the source eNB 100. The preamble comprises a symbol or code that the UE 104 employs to signal the target eNB 200 and initiate communications with the target eNB 200.

The preamble can comprise a contention-based (CB) preamble or can comprise a contention-free (CF) preamble. A CB preamble comprises a publicly known and available preamble. For example, an eNB can broadcast or publish a listing of CB preambles that can be used to access that particular eNB. However, the particular eNB does not regulate what devices can acquire and use a particular CB preamble. As a result, multiple devices can attempt to access the eNB at the same time and using the same CB preamble. The consequence is a signal collision, where one or more devices involved in the collision will not gain access to the eNB and must make additional access attempts.

In the contention-based random access, the UE 104 obtains a preamble for use with a particular eNB. The particular eNB is not aware what preamble the UE 104 obtains. The UE arbitrarily selects a CB preamble from the pool as the non-dedicated random access CB preamble. This is known as UE initiated random access. In contention-based random access, the network (or eNB) is not immediately aware of which UE selected which CB preamble. These preambles are known as dedicated random access preambles.

In contrast to the CB preamble, a contention-free (CF) random access preamble is assigned to the UE by the eNB. No other requesting device will be given the same CF preamble during the time period. In other words, the CF preamble cannot be autonomously selected by the UE. While the assigned CF preamble is valid, it is exclusively dedicated to the UE 104. This is also known as network-triggered or network-ordered random access. As a result, a device receiving the CF preamble will gain access to the eNB without danger of signal collision and delay. This eliminates the need for contention resolution and improves resource efficiency. Furthermore, avoiding the contention resolution procedure reduces delay. Consequently, a CF preamble is more desirable than a CB preamble.

In a multi-cell environment, the UE may receive a signal from one or more neighboring cells. The UE performs various scheduled measurements such as received signal amplitude and signal transport delay. Based on the measurements and event triggers given to the UE by the source base station, the UE may transmit a measurement report to the source base station. Based on the measurement report and neighboring base stations/cells included in the report, the source base station selects an appropriate/possible/preferred base station or cell to which to hand over the UE. The source base station transmits a handover request to the target base station in accordance with a handover subsystem.

The wireless network 150 decides when the UE 104 must be handed off from the first eNB 100 to the second eNB 200. The first eNB 100 can initiate the handoff, such as where the first eNB 100 determines that the UE 104 is approaching the cell edge region of the cell coverage area 120. The first eNB 100 can determine that the UE 104 is approaching the cell edge region by generating a signal strength measurement of the signal or signals received in the first eNB 100 from the UE 104. Alternatively, or in addition, the first eNB 100 can receive a signal strength measurement from the UE 104 wherein the signal strength measurement is the measured signal strength of a signal or signals received in the UE 104 from the first eNB 100. If the signal strength is below a predetermined strength threshold, then the eNB 100 can determine that the UE 104 is approaching the cell edge region.

Figure 2:
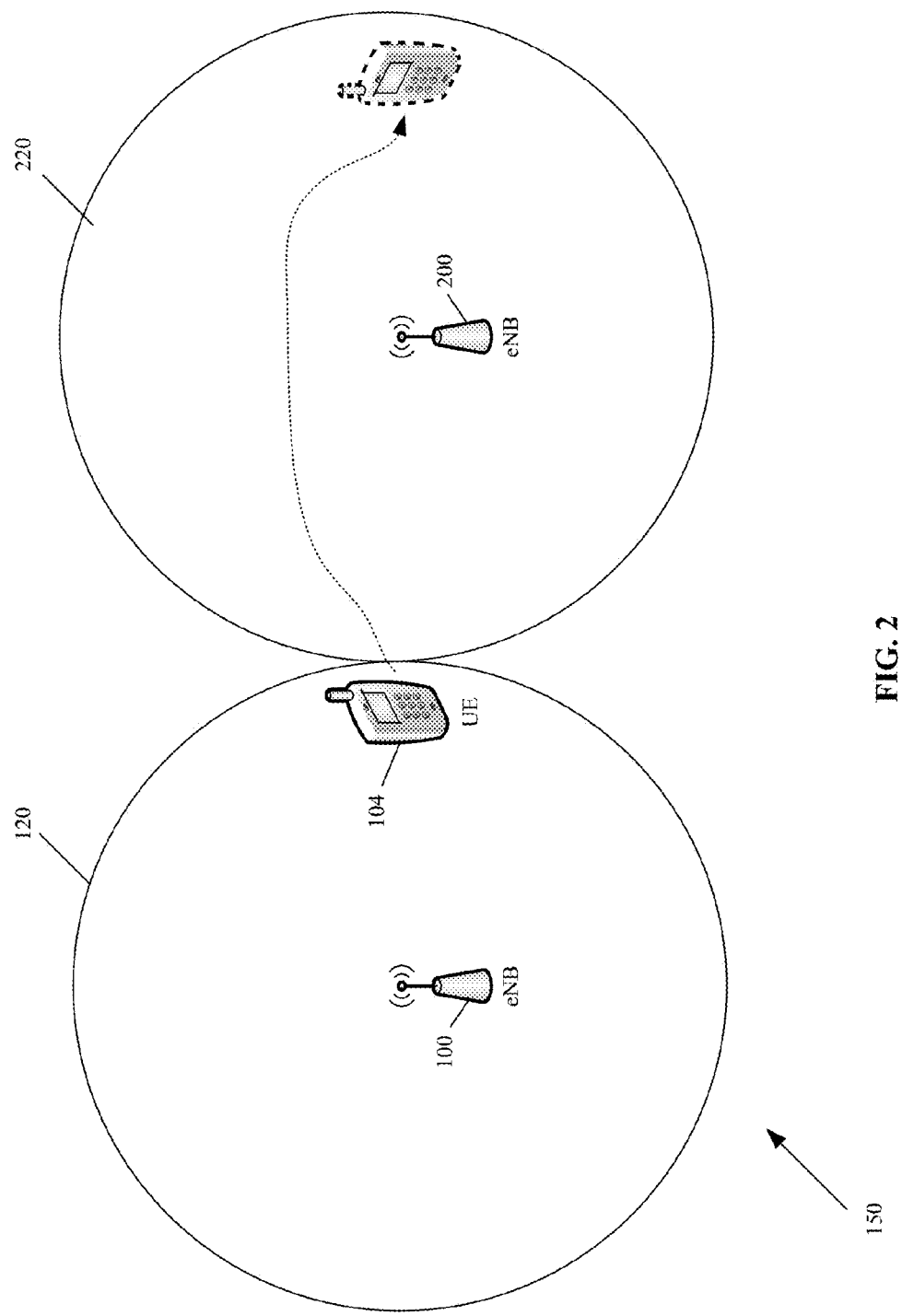
FIG. 2 shows the UE after a typical handoff process.

FIG. 2 shows the UE 104 after a typical handoff process. The UE 104 has moved continuously into the cell coverage area 220 of the second (or target) eNB 200 after the handoff. If the UE 104 returns to the first eNB 100, the UE 104 will have to go through a new handoff process.

Figure 3:
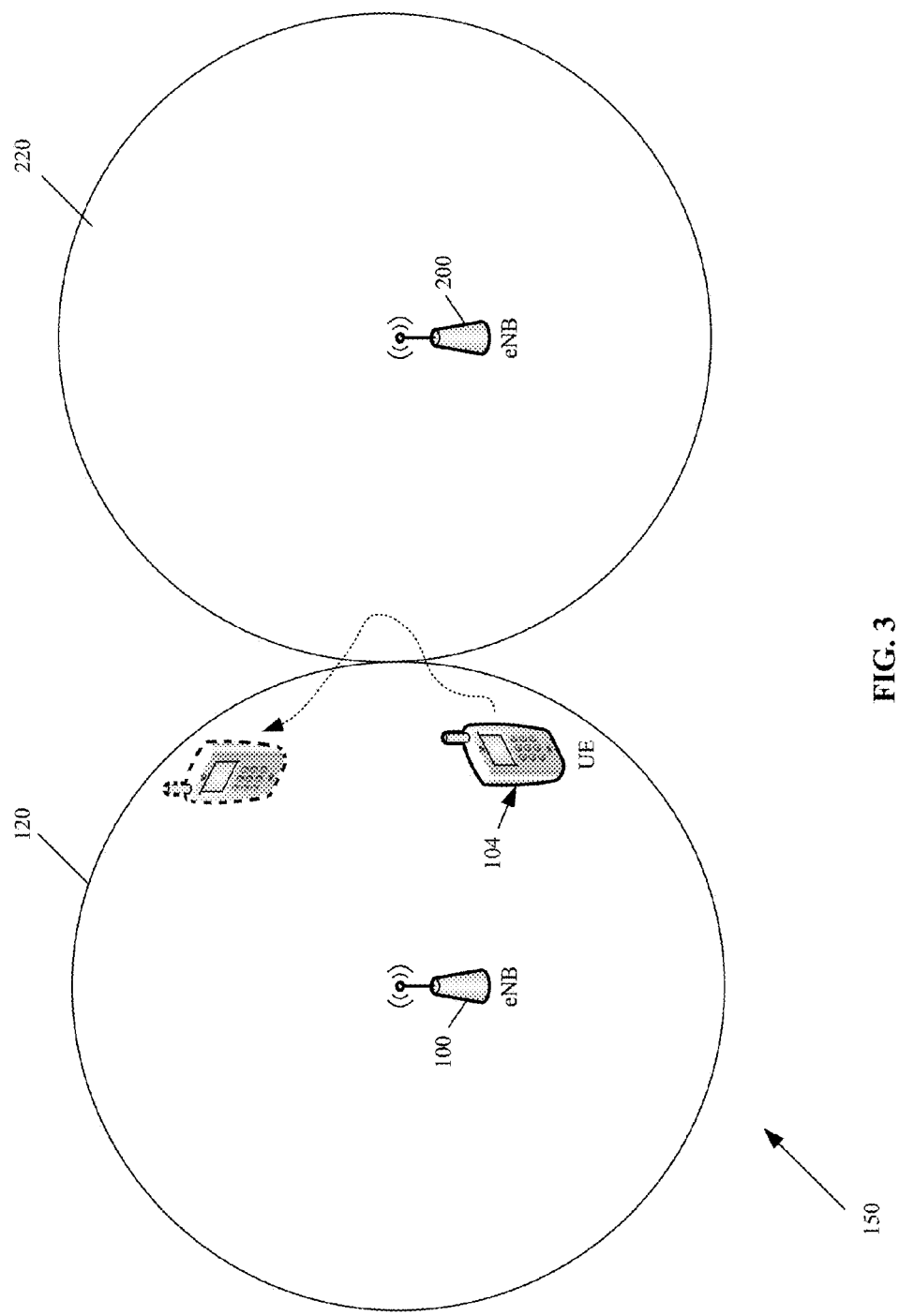
FIG. 3 shows the UE after a return following a handoff process.

FIG. 3 shows the UE 104 after a return following a handoff process. The UE 104 moves into the cell coverage area 220 of the second eNB 200 for a brief period of time, then returns to the cell coverage area 1210 of the first eNB 100. As a consequence, the UE 104 will have to acquire a new preamble as part of returning to the first eNB 100. A return may occur due to interference, fluctuations in base station signal strength, and/or motion of the UE, for example.

In the past, the UE 104 would have to acquire a CB preamble before being able to establish communications once again with the first eNB 100. This may result in delay, as previously discussed. This may interfere with a prompt handoff from the second eNB 200 back to the first eNB 100.

Figure 4:
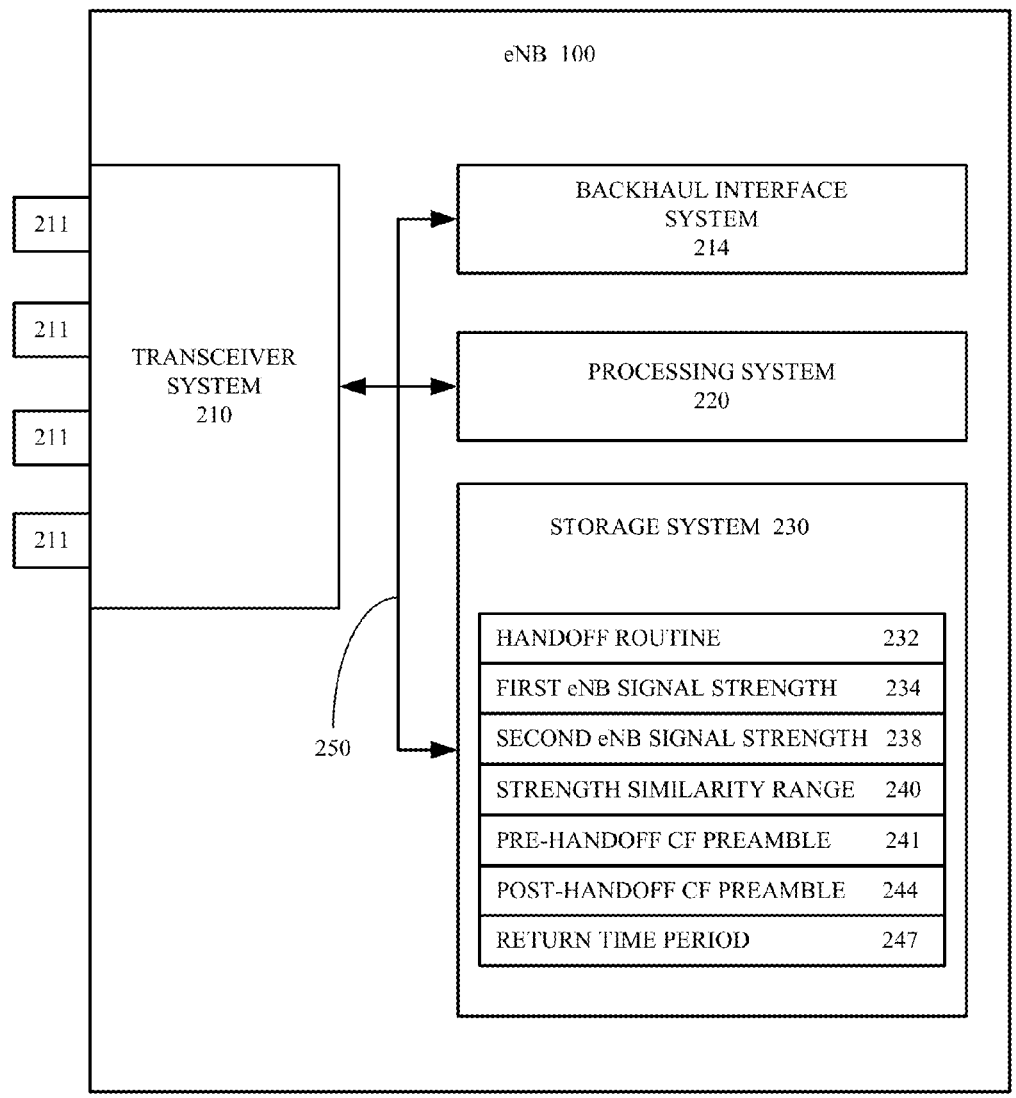
FIG. 4 shows an exemplary first eNB.

FIG. 4 shows an exemplary first eNB 100. The first eNB 100 includes a transceiver system 210, a backhaul interface system 214, a processing system 220, and a storage system 230. In operation, the processing system 220 is operatively linked to the transceiver system 210, the backhaul interface system 214, and the storage system 230, such as by a bus 250, for example. It should be understood that alternatively discrete links can be employed, such as network links or other circuitry. The eNB 100 can be distributed or consolidated among the equipment or circuitry that together form the elements of the first eNB 100. The first eNB 100 can optionally include additional devices, features, or functionality not shown for clarity.

The storage system 230 comprises computer-readable storage media that is readable by the processing system 220 and capable of storing information. In one example, the storage system 230 stores a handoff routine 232, a first eNB signal strength 234, a second eNB signal strength 238, a strength similarity range 240, a pre-handoff CF preamble 241, a post-handoff CF preamble 244, and a return time period 247.

The handoff routine 232 conducts at least a portion of a handoff process. The handoff routine 232 can be used by the eNB 100 to accomplish at least part of a handoff of the UE 104 from the first eNB 100 to the second eNB 200.

The first eNB signal strength 234 comprises a measured strength of signals received in the UE 104 from the first eNB 100. The first eNB signal strength 234 will vary according to a distance of the UE 104 from the first eNB 100. When the first eNB signal strength 234 is below a predetermined handoff threshold, the UE 104 will be handed off to another (and more suitable) eNB, such as the target eNB 200, in this example.

The second eNB signal strength 238 comprises a measured strength of signals received in the UE 104 from the second eNB 200. The second eNB signal strength 238 will vary according to a distance of the UE 104 from the second eNB 200.

The strength similarity range 240 comprises a predetermined signal difference threshold. If a difference between the first eNB signal strength 234 and the second eNB signal strength 238 falls within the strength similarity range 240, then the first eNB signal strength 234 and the second eNB signal strength 238 are determined to be substantially similar in strength. However, if the difference between the first eNB signal strength 234 and the second eNB signal strength 238 exceeds the strength similarity range 240, then the first eNB signal strength 234 and the second eNB signal strength 238 are determined to be substantially different in strength.

The pre-handoff CF preamble 241 comprises a preamble that is obtained from the second (i.e., target) eNB 200. The pre-handoff CF preamble 241 is obtained by the UE 104 in preparation for the UE 104 being handed off to the second eNB 200. The pre-handoff CF preamble 241 will be used by the UE 104 to initiate communications with the second eNB 200.

The post-handoff CF preamble 244 comprises a preamble that is obtained from the first (i.e., source) eNB 100. The post-handoff CF preamble 244 is obtained by the UE 104 in preparation for the possibility that the UE 104 may return to the first eNB 100 after the handoff to the second eNB 200. The pre-handoff CF preamble 241 will be used by the UE 104 to re-initiate communications with the first eNB 100, if the UE 104 returns to the first eNB 100.

The return time period 247 comprises a predetermined time period in which the post-handoff CF preamble 244 can be used by the UE 104 to return to the first eNB 100 after the handoff to the second eNB 200. If the return time period 247 expires after the handoff, then the UE 104 will have to obtain a CB preamble for return to the first eNB 100 and will have to use a contention-based RA signaling process to re-establish communications with the first eNB 100.

The handoff routine 232 can be implemented in program instructions and among other functions which can, when executed by the first eNB 100 in general or the processing system 220 in particular, operates to direct the first eNB 100 or the processing system 220 to obtain a pre-handoff contention-free (CF) preamble for handoff of the UE from the first eNB to a second eNB, provide the pre-handoff CF preamble to the UE, generate a post-handoff CF preamble for the UE, and providing the post-handoff CF preamble to the UE.

In some embodiments, the handoff routine 232 when executed by the first eNB 100 in general or the processing system 220 in particular operates to direct the first eNB 100 or the processing system 220 to obtain a pre-handoff contention-free (CF) preamble for handoff of the UE from the first eNB to a second eNB, provide the pre-handoff CF preamble to the UE, compare a first eNB signal strength of a signal received in the UE from the first eNB to a second eNB signal strength of a signal received in the UE from the second eNB, generate a post-handoff CF preamble if a signal strength difference between the first eNB signal strength and the second eNB signal strength does not exceed a predetermined strength similarity range, and provide the post-handoff CF preamble to the UE.

Figure 5:
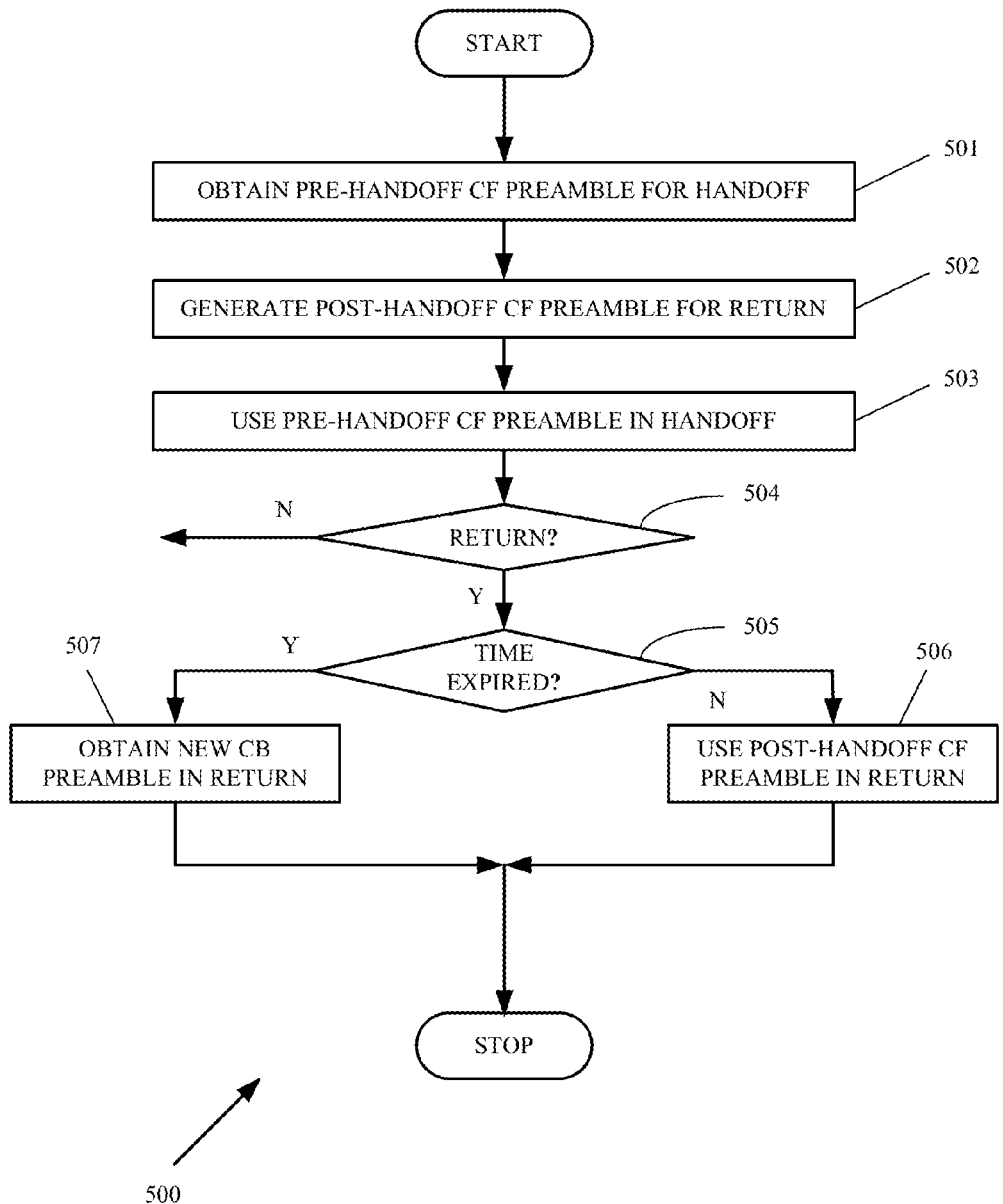
FIG. 5 is a flowchart of an exemplary contention-free handoff return method in a wireless network.

FIG. 5 is a flowchart 500 of an exemplary contention-free handoff return method in a wireless network. The handoff comprises a handoff of a UE from a first (i.e., source) eNB to a second (i.e., target) eNB. In step 501, where the handoff is imminent, the first eNB obtains a pre-handoff contention-free (CF) preamble from the second eNB. The pre-handoff CF preamble is obtained by the first eNB in preparation for the UE being handed off to the second eNB. The first eNB provides the pre-handoff CF preamble to the UE. The UE will use the pre-handoff CF preamble to initiate communications with the second eNB.

In step 502, the first eNB generates a post-handoff CF preamble and provides the post-handoff CF preamble to the UE. The post-handoff CF preamble is obtained by the first eNB in preparation for the possibility that the UE may return to the first eNB after the handoff to the second eNB. The pre-handoff CF preamble can be used by the UE to re-initiate communications with the first eNB, if the UE returns to the first eNB. A contention-free (CF) random access preamble is obtained and assigned to the UE by the eNB. The UE is not able to autonomously obtain the CF preamble, as previously discussed.

In step 503, the UE uses the pre-handoff CF preamble in the handoff to the second or target eNB. The pre-handoff CF preamble enables the UE to use a contention-free random access (RA) signaling process to establish communications with the second eNB. This can include the UE transmitting an access burst to the second eNB over a random access channel (RACH). The RACH is a channel configured for receiving access bursts from UEs as a step in initiating communications. Access bursts are transmitted by the UE to allow the target eNB to measure uplink communication parameters such as transmission delay, signal amplitude, and other needed communication parameters.

In step 504, the UE determines whether it is returning to the first eNB. A return may occur due to interference, fluctuations in base station signal strength, and/or motion of the UE, for example. If a return is occurring, the method proceeds to step 505. Otherwise, the method exits.

In step 505, the UE determines whether a predetermined return time period has expired. The return time period comprises a predetermined time period during which the post-handoff CF preamble can be used by the UE to return to the first eNB. If the return time period has expired, then the UE will have to obtain a CB preamble for return to the first eNB, and will have to use a contention-based RA signaling process to re-establish communications with the first eNB. If the return time period has not expired, then the method proceeds to step 506. Otherwise, the method branches to step 507.

In step 506, the UE uses the already-obtained post-handoff CF preamble in the return to the first eNB. The post-handoff CF preamble enables the UE to use a contention-free RA signaling process to re-establish communications with the first eNB. Consequently, the return handoff to the first eNB is therefore unlikely to suffer delay and/or retry attempts. As a result, the UE can return to the first eNB smoothly and uneventfully in the case of a handoff failure.

Alternatively, in step 507, the UE must obtain a CB preamble from the first eNB to be able to initiate the return process. As previously discussed, the CB preamble comprises a publicly known and available preamble. The first eNB can broadcast or publish a listing of CB preambles that can be used to publicly access the first eNB. The first eNB does not regulate or control which CB preamble is selected by the UE, however. As a result, multiple devices can attempt to access the first eNB at the same time and using the same CB preamble. The consequence may be a signal collision, where one or more devices involved in the collision will not gain access to the first eNB and must make additional access attempts.

Figure 6:
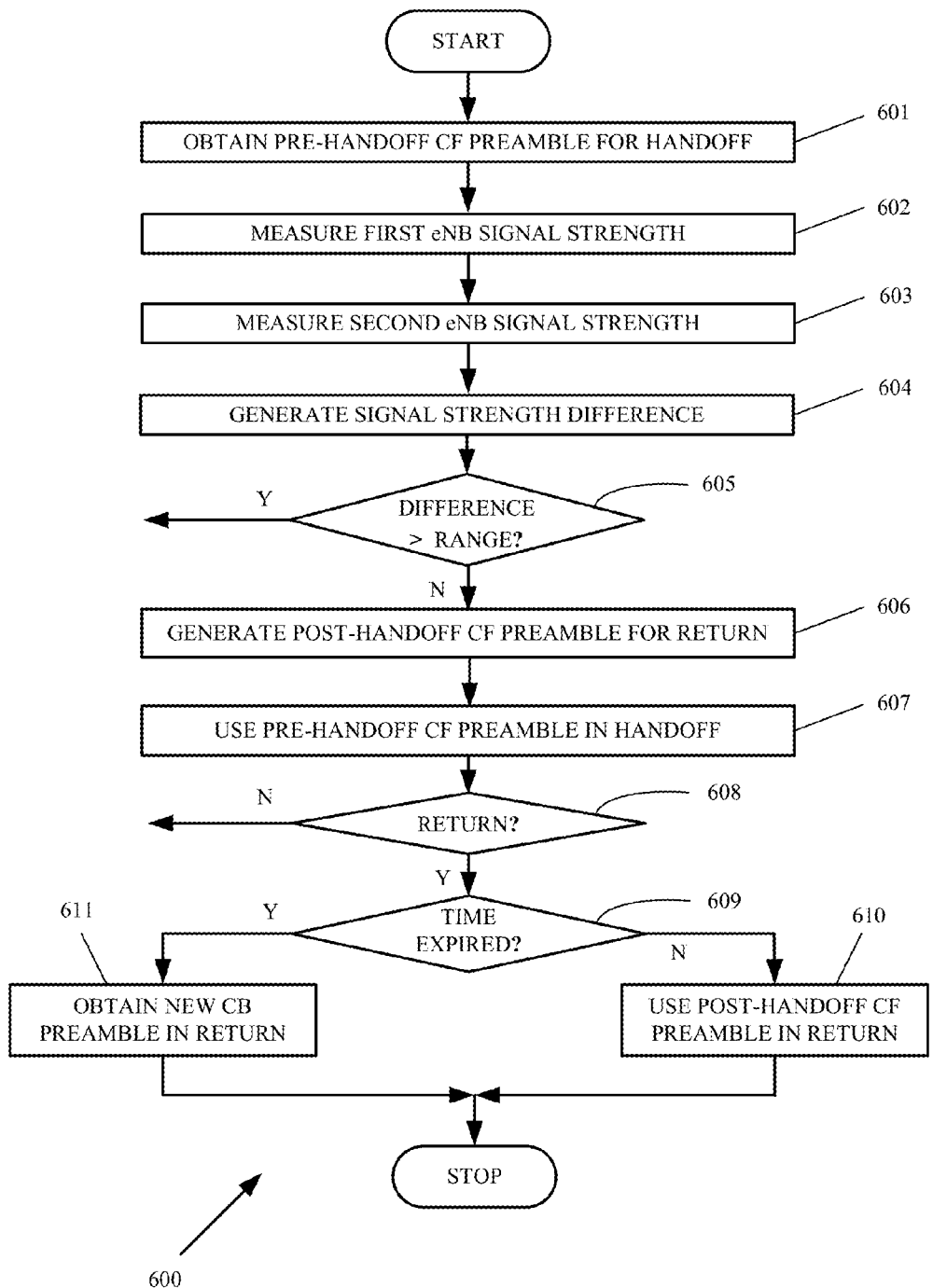
FIG. 6 is a flowchart of an exemplary contention-free handoff return method in a wireless network.

FIG. 6 is a flowchart 600 of an exemplary contention-free handoff return method in a wireless network. In step 601, where a handoff is imminent, the first eNB obtains a pre-handoff CF preamble, as previously discussed, and provides the pre-handoff CF preamble to the UE.

In step 602, the UE measures a first eNB signal strength. The first eNB signal strength comprises a measured strength of signals received in the UE from the first eNB. The first eNB signal strength will vary according to a distance of the UE from the first eNB.

In step 603, the UE measures a second eNB signal strength. The second eNB signal strength comprises a measured strength of signals received in the UE from the second eNB. The second eNB signal strength will vary according to a distance of the UE from the second eNB.

In step 604, the UE generates a signal strength difference between the first eNB signal strength and the second eNB signal strength. The signal strength difference is used to determine whether a return is likely. A return is likely only where source and target signal strengths are similar. If the target signal strength is much greater, then a return (or a return within a reasonably short time) is highly unlikely.

In step 605, the signal strength difference is compared to a predetermined strength similarity range. The predetermined strength similarity range represents a range of signal strength differences that are considered to be similar enough that a return is likely or possible. If the signal strength difference does not exceed the predetermined strength similarity range, then the method proceeds to step 606. Otherwise, where the signal strength difference exceeds the predetermined strength similarity range, the method exits (no return is judged to be likely and the UE uses only the obtained pre-handoff CF preamble in the upcoming handoff).

It should be understood that other or additional factors may be taken into account when determining whether a return will be problematic. For example, a handoff success rate between the first eNB and the second eNB may also be used in determining whether to obtain a post-handoff CF preamble.

In step 606, the first eNB obtains a post-handoff CF preamble and provides the post-handoff CF preamble to the UE, as previously discussed. The post-handoff CF preamble will be used by the UE to re-initiate communications with the first eNB if the UE returns to the first eNB.

In step 607, the UE uses the pre-handoff CF preamble in a handoff to the second or target eNB. The pre-handoff CF preamble enables the UE to use a contention-free RA signaling process to establish communications with the second eNB, as previously discussed.

In step 608, the UE determines whether it is returning to the first eNB, as previously discussed. If a return is occurring, the method proceeds to step 609. Otherwise, the method exits.

In step 609, the UE determines whether a return time period has expired, as previously discussed. If the return time period has expired, then the UE will have to obtain a CB preamble for return to the first eNB, and will have to use a contention-based RA signaling process to re-establish communications with the first eNB. If the return time period has not expired, then the method proceeds to step 610. Otherwise, the method branches to step 611.

In step 610, the UE uses the already-obtained post-handoff CF preamble in the return to the first eNB. The post-handoff CF preamble enables the UE to use a contention-free RA signaling process to re-establish communications with the first eNB, as previously discussed. As a result, the UE can return to the first eNB smoothly and uneventfully in the case of a handoff failure.

Alternatively, in step 611, the UE must obtain a CB preamble from the first eNB to be able to initiate the return process, as previously discussed.

The eNBs 100 and 200 can provide communication services including voice calls, text messages, data access, or other communication services provided over cellular or wireless communication networks. In some examples, the eNBs 100 and 200 include equipment to provide wireless access within different coverage areas, to route communications between content providers and user devices, and to facilitate handoffs between UEs within different coverage areas, among other operations.

The eNBs 100 and 200 may communicate with the UE 104 using a variety of frequencies and a variety of communication schemes. The eNBs 100 and 200 can provide multiple sectors of wireless coverage. It should be understood that any number of eNBs can be included in a wireless communication system.

The eNBs 100 and 200 comprise RF communication and control circuitry, transceivers, and antennas, as well as wireless communications equipment capable of communicating with and providing wireless access within a wireless coverage area to communication services for wireless communication devices, such as the UE 104. The RF communication circuitry typically includes amplifiers, filters, RF modulators, transceivers, and signal processing circuitry. The eNBs 100 and 200 may include processing equipment, routing equipment, and physical structures. The eNBs 100 and 200 may include transceiver and antenna equipment for exchanging wireless communications with one or more UEs 104 in a sector of wireless coverage. Further equipment, networks, and/or systems can be communicatively coupled to the eNBs 100 and 200, such as equipment, networks, and systems of cellular voice and data communication systems (not shown for clarity). It should be understood that the eNBs 100 and 200 can be distributed or consolidated among equipment or circuitry that together forms the elements of the eNBs 100 and 200. The eNBs 100 and 200 can optionally include additional devices, features, or functionality not discussed herein for the purpose of brevity.

The UE 104 may be a mobile device, including a cellular phone, but also may include other devices. The UE 104 may include one or more transceiver portions for communication over one or more wireless links of differing frequency bands. The UE 104 can receive wireless access information from one or more of the eNBs 100 and 200, such as beacon signals, channel information, frequency information, overhead signaling, neighbor lists, and the like. The UE 104 can move among any of the coverage areas associated with the eNBs 100 and 200 and receive wireless access.

The UE 104 can include one or more antennas, transceiver circuitry elements, and communication elements. The transceiver circuitry typically includes amplifiers, filters, modulators, and signal processing circuitry. The UE 104 can also include user interface systems, memory devices, non-transitory computer-readable storage mediums, software, processing circuitry, or some other communication components. The UE 104 can comprise subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

The transceiver system 210 comprises one or more communication interfaces for communicating with one or more UEs, namely multiple transceiver nodes 211. The transceiver system 210 operates the transceiver nodes 211 to conduct wireless communications with the UE 104, coordinate the handoff of the UE 104 with other eNBs or other devices or systems, exchange authentication or authorization information with other communication networks, and provide data and/or parameters to one or more UEs 104.

The backhaul interface system 214 includes a network interface for communicating with one or more communication networks, such as wire and/or wireless communication systems. Examples of the backhaul interface system 214 include network interface card equipment, transceivers, modems, and other communication circuitry. In addition, the backhaul interface system 214 can communicate with external devices. The backhaul interface system 214 provides command and control information and instructions to the processing system 220 or to the transceiver system 210. The backhaul interface system 214 can change data in the storage system 230 and can affect the operation of the processing system 220 and the operation of the first eNB 100.

The transceiver nodes 211 of the transceiver system 210 of the eNB 100 each include transceiver equipment for wirelessly exchanging user communications and overhead communications with user devices, omitted for clarity, using antenna arrays and the associated wireless links. The transceiver nodes 211 can comprise one or more antenna elements, RF coupling equipment, structural supports, cabling, or other equipment. In some examples, elements of the transceiver nodes 211 can comprise a directed antenna array, such as a yagi antenna, dish antenna, parabolic antenna, or phased antenna array to establish beam forming during transmissions to user devices.

The processing system 220 of the eNB 100 can comprise one or more microprocessors and other circuitry that retrieves and executes the handoff routine 232 from the storage system 230. The processing system 220 can be implemented within a single processing device but can also be distributed across multiple processing devices or sub-systems that cooperate in executing program instructions. Examples of the processing system 220 include general purpose central processing units, application specific processors, and logic devices, as well as any other type of processing device, combinations, or variations thereof.

The storage system 230 of the eNB 100 can comprise any computer readable storage media readable by the processing system 220 and capable of storing the handoff routine 232. The storage system 230 can include volatile and nonvolatile, removable and non-removable media implemented in any method or technology for storage of information, such as computer readable instructions, data structures, program modules, or other data.

In addition to storage media, in some implementations the storage system 230 can also include communication media over which the handoff routine 232 can be communicated. The storage system 230 can be implemented as a single storage device but can also be implemented across multiple storage devices or sub-systems co-located or distributed relative to each other. The storage system 230 can comprise additional elements, such as a controller, capable of communicating with the processing system 220. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

The handoff routine 232 of the eNB 100 can include additional processes, programs, or components, such as operating system software, database software, or application software. The handoff routine 232 can also comprise firmware or some other form of machine-readable processing instructions executable by the processing system 220. In at least one implementation, the program instructions can include first program instructions that direct the processing system 220 to exchange communications with the UE 104 over one or more transceiver nodes 211, among other operations.

In general, the handoff routine 232 can, when loaded into the processing system 220 and executed, transform the processing system 220 into a special-purpose computing system configured to exchange communications with the UE 104 over one or more transceiver nodes, among other operations. Encoding the handoff routine 232 on the storage system 230 can transform the physical structure of the storage system 230. The specific transformation of the physical structure can depend on various factors in different implementations of this description. Examples of such factors can include, but are not limited to the technology used to implement the storage media of the storage system 230 and whether the computer-storage media are characterized as primary or secondary storage. For example, if the computer-storage media are implemented as semiconductor-based memory, the handoff routine 232 can transform the physical state of the semiconductor memory when the program is encoded therein. For example, the handoff routine 232 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A first enhanced Node B (eNB) for contention-free handoff return in a wireless network, the first eNB comprising:
   a transceiver system configured to communicate with a User Equipment (UE); and
   a processing system coupled to the transceiver system and configured to receive a signal strength information from the UE via the transceiver system;
   the processing system configured to obtain a pre-handoff CF preamble for handoff of the UE from the first eNB to a second eNB and provide the pre-handoff CF preamble to the UE;
   the processing system configured to generate a post-handoff CF preamble for the UE and a predetermined preamble expiration time period, wherein the first eNB is configured to expire the post-handoff CF preamble after the predetermined preamble expiration time period; and
   the transceiver system configured to transfer the post-handoff CF preamble for delivery to the UE.

2. The first eNB of claim 1, configured to allow the UE to use the post-handoff CF preamble to return from the second eNB to the first eNB.

3. The first eNB of claim 1, configured to allow the UE to use the post-handoff CF preamble to return from the second eNB to the first eNB after the UE uses the pre-handoff CF preamble in the handoff from the first eNB to the second eNB.

4. The first eNB of claim 1, configured to allow the UE to use the post-handoff CF preamble to return from the second eNB to the first eNB if the handoff is not successful.

5. The first eNB of claim 1, configured to allow the UE to use the post-handoff CF preamble to return from the second eNB to the first eNB where the UE returns to the first eNB within a predetermined return time period after the handoff.

6. The first eNB of claim 1, with the first eNB generating the post-handoff CF preamble further comprising:
   in the first eNB, comparing a first eNB signal strength of a signal received in the UE from the first eNB to a second eNB signal strength of a signal received in the UE from the second eNB; and
   in the first eNB, generating the post-handoff CF preamble if a signal strength difference between the first eNB signal strength and the second eNB signal strength does not exceed a predetermined strength similarity range.

7. A contention-free handoff return method for a wireless network having a first enhanced Node B (eNB), comprising:
   in the first eNB, obtaining a pre-handoff contention-free (CF) preamble for handoff of the UE from the first eNB to a second eNB;
   in the first eNB, providing the pre-handoff CF preamble to the UE;
   in the first eNB, generating a post-handoff CF preamble for the UE and a predetermined preamble expiration time period, wherein the first eNB is configured to expire the post-handoff CF preamble after the predetermined preamble expiration time period; and
   in the first eNB, providing the post-handoff CF preamble to the UE.

8. The method of claim 7, with the first eNB generating the post-handoff CF preamble further comprising:
   in the first eNB, comparing a first eNB signal strength of a signal received in the UE from the first eNB to a second eNB signal strength of a signal received in the UE from the second eNB; and
   in the first eNB, generating the post-handoff CF preamble if a signal strength difference between the first eNB signal strength and the second eNB signal strength does not exceed a predetermined strength similarity range.

9. The method of claim 7, wherein the UE uses the post-handoff CF preamble to return from the second eNB to the first eNB.

10. The method of claim 7, wherein the UE uses the post-handoff CF preamble to return from the second eNB to the first eNB after the UE uses the pre-handoff CF preamble in the handoff from the first eNB to the second eNB.

11. The method of claim 7, wherein the UE uses the post-handoff CF preamble to return from the second eNB to the first eNB if the handoff is not successful.

12. The method of claim 7, wherein the UE uses the post-handoff CF preamble to return from the second eNB to the first eNB where the UE returns to the first eNB within a predetermined return time period after the handoff.

13. A contention-free handoff return method for a wireless network having a first eNB, comprising:
   in the first eNB, obtaining a pre-handoff contention-free (CF) preamble for handoff of the UE from the first eNB to a second eNB;
   in the first eNB, providing the pre-handoff CF preamble to the UE;
   in the first eNB, comparing a first eNB signal strength of a signal received in the UE from the first eNB to a second eNB signal strength of a signal received in the UE from the second eNB;
   in the first eNB, generating a post-handoff CF preamble if a signal strength difference between the first eNB signal strength and the second eNB signal strength does not exceed a predetermined strength similarity range and generating a predetermined preamble expiration time period, wherein the first eNB is configured to expire the post-handoff CF preamble after the predetermined preamble expiration time period; and
   in the first eNB, providing the post-handoff CF preamble to the UE.

14. The method of claim 13, wherein the UE uses the post-handoff CF preamble to return from the second eNB to the first eNB.

15. The method of claim 13, wherein the UE uses the post-handoff CF preamble to return from the second eNB to the first eNB after the UE uses the pre-handoff CF preamble in the handoff from the first eNB to the second eNB.

16. The method of claim 13, wherein the UE uses the post-handoff CF preamble to return from the second eNB to the first eNB if the handoff is not successful.

17. The method of claim 13, wherein the UE uses the post-handoff CF preamble to return from the second eNB to the first eNB where the UE returns to the first eNB within a predetermined return time period after the handoff.

* * * * *